United States Patent
Fairfield et al.

(10) Patent No.: US 9,195,236 B1
(45) Date of Patent: Nov. 24, 2015

(54) ROAD FLARE DETECTION

(75) Inventors: Nathaniel Fairfield, Mountain View, CA (US); David Ian Ferguson, San Francisco, CA (US)

(73) Assignee: Google Inc., Mountain View, CA (US)

( * ) Notice: Subject to any disclaimer, the term of this patent is extended or adjusted under 35 U.S.C. 154(b) by 551 days.

(21) Appl. No.: 13/603,609

(22) Filed: Sep. 5, 2012

(51) Int. Cl.
*G01C 22/00* (2006.01)
*G05D 1/00* (2006.01)
*G05D 1/02* (2006.01)
*B60W 30/09* (2012.01)

(52) U.S. Cl.
CPC .............. *G05D 1/0246* (2013.01); *B60W 30/09* (2013.01)

(58) Field of Classification Search
None
See application file for complete search history.

(56) References Cited

U.S. PATENT DOCUMENTS

| | | | |
|---|---|---|---|
| 5,153,722 A * | 10/1992 | Goedeke et al. | 348/159 |
| 8,139,109 B2 | 3/2012 | Schmiedel et al. | |
| 2007/0291130 A1 * | 12/2007 | Broggi et al. | 348/218.1 |
| 2012/0035788 A1 | 2/2012 | Trepagnier et al. | |
| 2012/0101680 A1 | 4/2012 | Trepagnier et al. | |
| 2012/0148148 A1 * | 6/2012 | Ko et al. | 382/159 |

FOREIGN PATENT DOCUMENTS

WO 2007113428 10/2007

* cited by examiner

*Primary Examiner* — Mussa A Shaawat
*Assistant Examiner* — Abdhesh Jha
(74) *Attorney, Agent, or Firm* — McDonnell Boehnen Hulbert & Berghoff LLP

(57) ABSTRACT

Methods and systems for road flare detection are described. A computing device configured to control the vehicle, may be configured to receive, from an image-capture device, images; image portions of the images may depict an area within a predetermined distance from a surface of a road on which the vehicle is travelling. Also, the computing device may be configured to determine, based on characteristics of an object depicted in the image portions such as color spectrum of the object, brightness of the object, and whether the object is stationary or moving with respect to the road, a likelihood that the object represents a road flare. Based on the likelihood, the computing device may be configured to modify a control strategy associated with a driving behavior of the vehicle; and control the vehicle based on the modified control strategy.

17 Claims, 6 Drawing Sheets

ROAD FLARE DETECTION

BACKGROUND

Autonomous vehicles use various computing systems to aid in transporting passengers from one location to another. Some autonomous vehicles may require some initial input or continuous input from an operator, such as a pilot, driver, or passenger. Other systems, for example autopilot systems, may be used only when the system has been engaged, which permits the operator to switch from a manual mode (where the operator exercises a high degree of control over the movement of the vehicle) to an autonomous mode (where the vehicle essentially drives itself) to modes that lie somewhere in between.

SUMMARY

The present application discloses embodiments that relate to detection of a road flare. In one aspect, the present application describes a method. The method may comprise receiving, at a computing device configured to control a vehicle, from an image-capture device coupled to the computing device, one or more images. One or more image portions of the one or more images may depict an area within a predetermined distance from a surface of a road on which the vehicle is travelling. The method also may comprise determining, using the computing device, based on one or more characteristics of an object depicted in the one or more image portions, a likelihood that the object represents a road flare. The one or more characteristics may include at least one of (i) a color spectrum of the object, (ii) a brightness of the object, and (iii) whether the object is stationary or moving with respect to the road. The method also may comprise modifying, using the computing device, a control strategy associated with a driving behavior of the vehicle, based on the likelihood; and further may comprise controlling, using the computing device, the vehicle based on the modified control strategy.

In another aspect, the present application describes a non-transitory computer readable medium having stored thereon instructions executable by a computing device of a vehicle to cause the computing device to perform functions. The functions may comprise receiving, from an image-capture device coupled to the computing device, one or more images. One or more image portions of the one or more images may depict an area within a predetermined distance from a surface of a road on which the vehicle is travelling. The functions also may comprise determining, based on one or more characteristics of an object depicted in the one or more image portions, a likelihood that the object represents a road flare. The one or more characteristics may include at least one of (i) a color spectrum of the object, (ii) a brightness of the object, and (iii) whether the object is stationary or moving with respect to the road. The functions also may comprise modifying a control strategy associated with a driving behavior of the vehicle, based on the likelihood; and further may comprise controlling the vehicle based on the modified control strategy.

In still another aspect, the present application describes a control system for a vehicle. The control system may comprise an image-capture device. The control system also may comprise a computing device in communication with the image capture-device and configured to receive, from the image-capture device, one or more images. One or more image portions of the one or more images may depict an area within a predetermined distance from a surface of a road on which the vehicle is travelling. The computing device also may be configured to determine, based on one or more characteristics of an object depicted in the one or more image portions, a likelihood that the object represents a road flare. The one or more characteristics may include at least one of (i) a color spectrum of the object, (ii) a brightness of the object, and (iii) whether the object is stationary or moving with respect to the road. The computing device further may be configured to modify a control strategy associated with a driving behavior of the vehicle, based on the likelihood; and control the vehicle based on the modified control strategy.

The foregoing summary is illustrative only and is not intended to be in any way limiting. In addition to the illustrative aspects, embodiments, and features described above, further aspects, embodiments, and features will become apparent by reference to the figures and the following detailed description.

DETAILED DESCRIPTION

Figure 1:
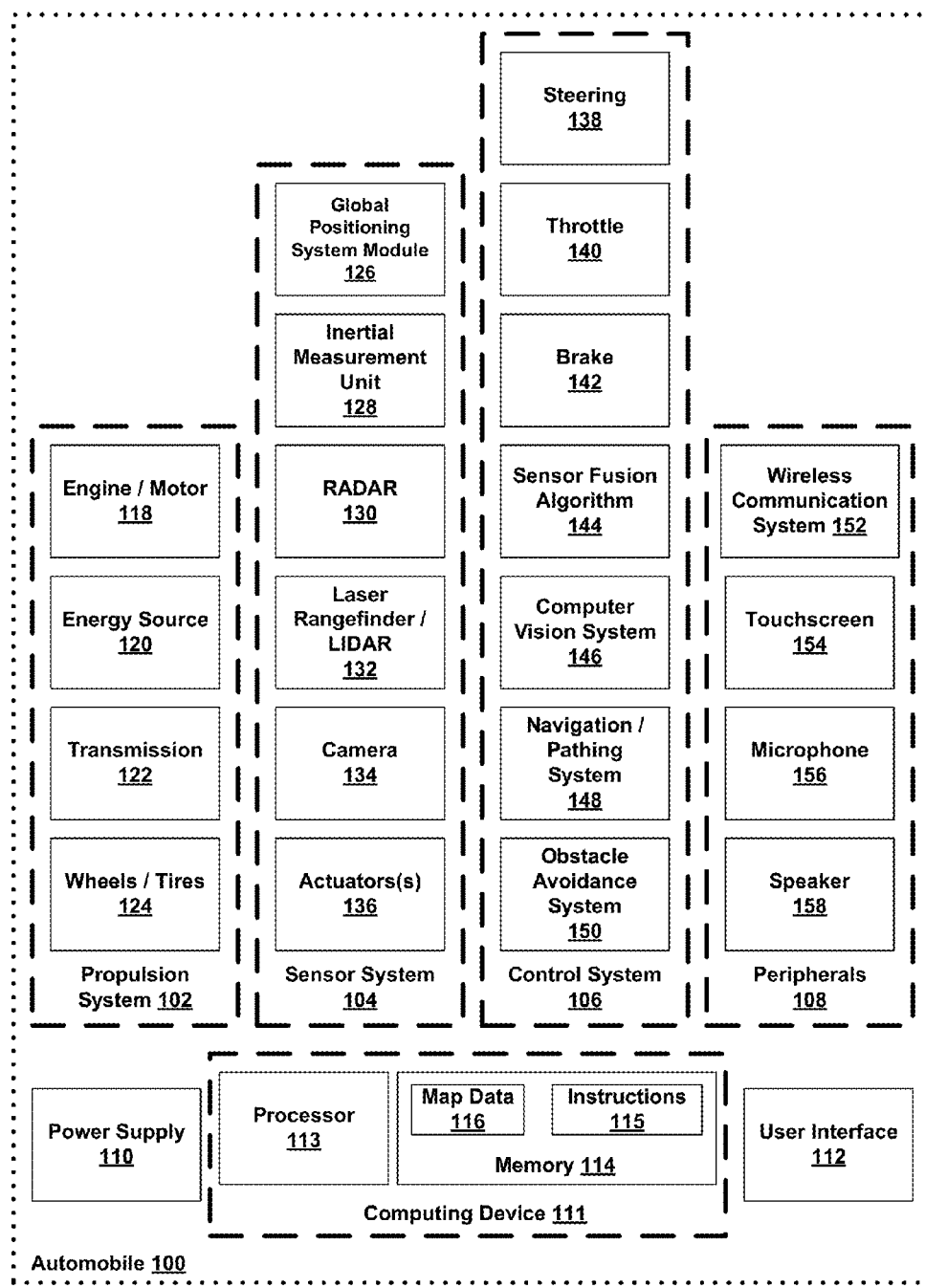
FIG. 1 is a simplified block diagram of an example automobile, in accordance with an example embodiment.

The following detailed description describes various features and functions of the disclosed systems and methods with reference to the accompanying figures. In the figures, similar symbols identify similar components, unless context dictates otherwise. The illustrative system and method embodiments described herein are not meant to be limiting. It may be readily understood that certain aspects of the disclosed systems and methods can be arranged and combined in a wide variety of different configurations, all of which are contemplated herein.

An autonomous vehicle operating on a road may rely on maps for navigation. In some examples, hazard conditions on the road, such as accident sites or obstacles, may not be reflected in the maps. However, such hazard conditions may be identified by road flares. Therefore, the autonomous vehicle may be configured to detect hazard conditions on the road by detecting road flares.

A road flare may be a type of pyrotechnic (material capable of undergoing self-contained and self-sustained exothermic chemical reaction) that produces a brilliant light or intense heat without an explosion. Road flares can be used for signaling, illumination, indicating obstacles or advising caution in hazard conditions on roads. Road flares may produce light through combustion of a pyrotechnic composition. Flares may be colored by inclusion of pyrotechnic colorants. In an example, a road flare may burn for 10-60 minutes with a bright red light.

In an example, a computing device, configured to control a vehicle, may be configured to receive, from an image-capture device coupled to the computing device, one or more images. One or more image portions of the one or more images may depict an area within a predetermined distance from a surface of a road on which a vehicle is travelling. Also, the computing device may be configured to determine, based on characteristics of an object depicted in the one or more image portions, a likelihood that the object represents a road flare. The characteristics may include color spectrum of the object, brightness of the object, and whether the object is stationary or moving with respect to the road. Based on the likelihood, the computing device may be configured to modify a control strategy associated with a driving behavior of the vehicle; and control the vehicle based on the modified control strategy.

An example vehicle control system may be implemented in or may take the form of an automobile. Alternatively, a vehicle control system may be implemented in or take the form of other vehicles, such as cars, trucks, motorcycles, buses, boats, airplanes, helicopters, lawn mowers, recreational vehicles, amusement park vehicles, farm equipment, construction equipment, trams, golf carts, trains, and trolleys. Other vehicles are possible as well.

Further, an example system may take the form of non-transitory computer-readable medium, which has program instructions stored thereon that are executable by at least one processor to provide the functionality described herein. An example system may also take the form of an automobile or a subsystem of an automobile that includes such a non-transitory computer-readable medium having such program instructions stored thereon.

Referring now to the Figures, FIG. 1 is a simplified block diagram of an example automobile 100, in accordance with an example embodiment. Components coupled to or included in the automobile 100 may include a propulsion system 102, a sensor system 104, a control system 106, peripherals 108, a power supply 110, a computing device 111, and a user interface 112. The computing device 111 may include a processor 113, and a memory 114. The memory 114 may include instructions 115 executable by the processor 113, and may also store map data 116. Components of the automobile 100 may be configured to work in an interconnected fashion with each other and/or with other components coupled to respective systems. For example, the power supply 110 may provide power to all the components of the automobile 100. The computing device 111 may be configured to receive information from and control the propulsion system 102, the sensor system 104, the control system 106, and the peripherals 108. The computing device 111 may be configured to generate a display of images on and receive inputs from the user interface 112.

In other examples, the automobile 100 may include more, fewer, or different systems, and each system may include more, fewer, or different components. Additionally, the systems and components shown may be combined or divided in any number of ways.

The propulsion system 102 may be configured to provide powered motion for the automobile 100. As shown, the propulsion system 102 includes an engine/motor 118, an energy source 120, a transmission 122, and wheels/tires 124.

The engine/motor 118 may be or include any combination of an internal combustion engine, an electric motor, a steam engine, and a Stirling engine. Other motors and engines are possible as well. In some examples, the propulsion system 102 could include multiple types of engines and/or motors. For instance, a gas-electric hybrid car could include a gasoline engine and an electric motor. Other examples are possible.

The energy source 120 may be a source of energy that powers the engine/motor 118 in full or in part. That is, the engine/motor 118 may be configured to convert the energy source 120 into mechanical energy. Examples of energy sources 120 include gasoline, diesel, other petroleum-based fuels, propane, other compressed gas-based fuels, ethanol, solar panels, batteries, and other sources of electrical power. The energy source(s) 120 could additionally or alternatively include any combination of fuel tanks, batteries, capacitors, and/or flywheels. In some examples, the energy source 120 may provide energy for other systems of the automobile 100 as well.

The transmission 122 may be configured to transmit mechanical power from the engine/motor 118 to the wheels/tires 124. To this end, the transmission 122 may include a gearbox, clutch, differential, drive shafts, and/or other elements. In examples where the transmission 122 includes drive shafts, the drive shafts could include one or more axles that are configured to be coupled to the wheels/tires 124.

The wheels/tires 124 of automobile 100 could be configured in various formats, including a unicycle, bicycle/motorcycle, tricycle, or car/truck four-wheel format. Other wheel/tire formats are possible as well, such as those including six or more wheels. The wheels/tires 124 of automobile 100 may be configured to rotate differentially with respect to other wheels/tires 124. In some examples, the wheels/tires 124 may include at least one wheel that is fixedly attached to the transmission 122 and at least one tire coupled to a rim of the wheel that could make contact with the driving surface. The wheels/tires 124 may include any combination of metal and rubber, or combination of other materials.

The propulsion system 102 may additionally or alternatively include components other than those shown.

The sensor system 104 may include a number of sensors configured to sense information about an environment in which the automobile 100 is located. As shown, the sensors of the sensor system include a Global Positioning System (GPS) module 126, an inertial measurement unit (IMU) 128, a radio detection and ranging (RADAR) unit 130, a laser rangefinder and/or light detection and ranging (LIDAR) unit 132, a camera 134, and actuators 136 configured to modify a position and/or orientation of the sensors. The sensor system 104 may include additional sensors as well, including, for example, sensors that monitor internal systems of the automobile 100 (e.g., an $O_2$ monitor, a fuel gauge, an engine oil temperature, etc.). Other sensors are possible as well.

The GPS module 126 may be any sensor configured to estimate a geographic location of the automobile 100. To this end, the GPS module 126 may include a transceiver configured to estimate a position of the automobile 100 with respect to the Earth, based on satellite-based positioning data. In an example, the computing device 111 may be configured to use the GPS module 126 in combination with the map data 116 to estimate a location of a lane boundary on road on which the automobile 100 may be travelling on. The GPS module 126 may take other forms as well.

The IMU 128 may be any combination of sensors configured to sense position and orientation changes of the automobile 100 based on inertial acceleration. In some examples, the combination of sensors may include, for example, accelerometers and gyroscopes. Other combinations of sensors are possible as well.

The RADAR unit 130 may be considered as an object detection system that may be configured to use radio waves to determine characteristics of the object such as range, altitude, direction, or speed of the object. The RADAR unit 130 may be configured to transmit pulses of radio waves or microwaves that may bounce off any object in a path of the waves. The object may return a part of energy of the waves to a receiver (e.g., dish or antenna), which may be part of the RADAR unit 130 as well. The RADAR unit 130 also may be configured to perform digital signal processing of received signals (bouncing off the object) and may be configured to identify the object.

Other systems similar to RADAR have been used in other parts of the electromagnetic spectrum. One example is LIDAR (light detection and ranging), which may be configured to use visible light from lasers rather than radio waves.

The LIDAR unit 132 may include a sensor configured to sense or detect objects in an environment in which the automobile 100 is located using light. Generally, LIDAR is an optical remote sensing technology that can measure distance to, or other properties of, a target by illuminating the target with light. The light can be any type of electromagnetic waves such as laser. As an example, the LIDAR unit 132 may include a laser source and/or laser scanner configured to emit pulses of laser and a detector configured to receive reflections of the laser. For example, the LIDAR unit 132 may include a laser range finder reflected by a rotating mirror, and the laser is scanned around a scene being digitized, in one or two dimensions, gathering distance measurements at specified angle intervals. In examples, the LIDAR unit 132 may include components such as light (e.g., laser) source, scanner and optics, photo-detector and receiver electronics, and position and navigation system.

In an example, The LIDAR unit 132 may be configured to use ultraviolet (UV), visible, or infrared light to image objects and can be used with a wide range of targets, including non-metallic objects. In one example, a narrow laser beam can be used to map physical features of an object with high resolution.

In examples, wavelengths in a range from about 10 micrometers (infrared) to about 250 nm (UV) could be used. Typically light is reflected via backscattering. Different types of scattering are used for different LIDAR applications, such as Rayleigh scattering, Mie scattering and Raman scattering, as well as fluorescence. Based on different kinds of backscattering, LIDAR can be accordingly called Rayleigh LIDAR, Mie LIDAR, Raman LIDAR and Na/Fe/K Fluorescence LIDAR, as examples. Suitable combinations of wavelengths can allow for remote mapping of objects by looking for wavelength-dependent changes in intensity of reflected signals, for example.

Three-dimensional (3D) imaging can be achieved using both scanning and non-scanning LIDAR systems. "3D gated viewing laser radar" is an example of a non-scanning laser ranging system that applies a pulsed laser and a fast gated camera. Imaging LIDAR can also be performed using an array of high speed detectors and a modulation sensitive detectors array typically built on single chips using CMOS (complementary metal-oxide-semiconductor) and hybrid CMOS/CCD (charge-coupled device) fabrication techniques. In these devices, each pixel may be processed locally by demodulation or gating at high speed such that the array can be processed to represent an image from a camera. Using this technique, many thousands of pixels may be acquired simultaneously to create a 3D point cloud representing an object or scene being detected by the LIDAR unit 132.

A point cloud may include a set of vertices in a 3D coordinate system. These vertices may be defined by X, Y, and Z coordinates, for example, and may represent an external surface of an object. The LIDAR unit 132 may be configured to create the point cloud by measuring a large number of points on the surface of the object, and may output the point cloud as a data file. As the result of a 3D scanning process of the object by the LIDAR unit 132, the point cloud can be used to identify and visualize the object.

In one example, the point cloud can be directly rendered to visualize the object. In another example, the point cloud may be converted to polygon or triangle mesh models through a process that may be referred to as surface reconstruction. Example techniques for converting a point cloud to a 3D surface may include Delaunay triangulation, alpha shapes, and ball pivoting. These techniques include building a network of triangles over existing vertices of the point cloud. Other example techniques may include converting the point cloud into a volumetric distance field and reconstructing an implicit surface so defined through a marching cubes algorithm.

The camera 134 may be any camera (e.g., a still camera, a video camera, etc.) configured to capture images of the environment in which the automobile 100 is located. To this end, the camera may be configured to detect visible light, or may be configured to detect light from other portions of the spectrum, such as infrared or ultraviolet light. Other types of cameras are possible as well. The camera 134 may be a two-dimensional detector, or may have a three-dimensional spatial range. In some examples, the camera 134 may be, for example, a range detector configured to generate a two-dimensional image indicating a distance from the camera 134 to a number of points in the environment. To this end, the camera 134 may use one or more range detecting techniques. For example, the camera 134 may be configured to use a structured light technique in which the automobile 100 illuminates an object in the environment with a predetermined light pattern, such as a grid or checkerboard pattern and uses the camera 134 to detect a reflection of the predetermined light pattern off the object. Based on distortions in the reflected light pattern, the automobile 100 may be configured to determine the distance to the points on the object. The predetermined light pattern may comprise infrared light, or light of another wavelength.

The actuators 136 may, for example, be configured to modify a position and/or orientation of the sensors.

The sensor system 104 may additionally or alternatively include components other than those shown.

The control system 106 may be configured to control operation of the automobile 100 and its components. To this end, the control system 106 may include a steering unit 138, a throttle 140, a brake unit 142, a sensor fusion algorithm 144, a computer vision system 146, a navigation or pathing system 148, and an obstacle avoidance system 150.

The steering unit 138 may be any combination of mechanisms configured to adjust the heading or direction of the automobile 100.

The throttle 140 may be any combination of mechanisms configured to control the operating speed and acceleration of the engine/motor 118 and, in turn, the speed and acceleration of the automobile 100.

The brake unit 142 may be any combination of mechanisms configured to decelerate the automobile 100. For example, the brake unit 142 may use friction to slow the wheels/tires 124. As another example, the brake unit 142 may be configured to be regenerative and convert the kinetic energy of the wheels/tires 124 to electric current. The brake unit 142 may take other forms as well.

The sensor fusion algorithm 144 may include an algorithm (or a computer program product storing an algorithm) executable by the computing device 111, for example. The sensor fusion algorithm 144 may be configured to accept data from the sensor system 104 as an input. The data may include, for example, data representing information sensed at the sensors of the sensor system 104. The sensor fusion algorithm 144 may include, for example, a Kalman filter, a Bayesian network, or another algorithm. The sensor fusion algorithm 144 further may be configured to provide various assessments based on the data from the sensor system 104, including, for example, evaluations of individual objects and/or features in the environment in which the automobile 100 is located, evaluations of particular situations, and/or evaluations of possible impacts based on particular situations. Other assessments are possible as well The computer vision system 146 may be any system configured to process and analyze images captured by the camera 134 in order to identify objects and/or features in the environment in which the automobile 100 is located, including, for example, lane information, traffic signals and obstacles. To this end, the computer vision system 146 may use an object recognition algorithm, a Structure from Motion (SFM) algorithm, video tracking, or other computer vision techniques. In some examples, the computer vision system 146 may additionally be configured to map the environment, track objects, estimate speed of objects, etc.

The navigation and pathing system 148 may be any system configured to determine a driving path for the automobile 100. The navigation and pathing system 148 may additionally be configured to update the driving path dynamically while the automobile 100 is in operation. In some examples, the navigation and pathing system 148 may be configured to incorporate data from the sensor fusion algorithm 144, the GPS module 126, and one or more predetermined maps so as to determine the driving path for the automobile 100.

The obstacle avoidance system 150 may be any system configured to identify, evaluate, and avoid or otherwise negotiate obstacles in the environment in which the automobile 100 is located.

The control system 106 may additionally or alternatively include components other than those shown.

Peripherals 108 may be configured to allow the automobile 100 to interact with external sensors, other automobiles, and/or a user. To this end, the peripherals 108 may include, for example, a wireless communication system 152, a touchscreen 154, a microphone 156, and/or a speaker 158.

The wireless communication system 152 may be any system configured to be wirelessly coupled to one or more other automobiles, sensors, or other entities, either directly or via a communication network. To this end, the wireless communication system 152 may include an antenna and a chipset for communicating with the other automobiles, sensors, or other entities either directly or over an air interface. The chipset or wireless communication system 152 in general may be arranged to communicate according to one or more other types of wireless communication (e.g., protocols) such as Bluetooth, communication protocols described in IEEE 802.11 (including any IEEE 802.11 revisions), cellular technology (such as GSM, CDMA, UMTS, EV-DO, WiMAX, or LTE), Zigbee, dedicated short range communications (DSRC), and radio frequency identification (RFID) communications, among other possibilities. The wireless communication system 152 may take other forms as well.

The touchscreen 154 may be used by a user to input commands to the automobile 100. To this end, the touchscreen 154 may be configured to sense at least one of a position and a movement of a user's finger via capacitive sensing, resistance sensing, or a surface acoustic wave process, among other possibilities. The touchscreen 154 may be capable of sensing finger movement in a direction parallel or planar to the touchscreen surface, in a direction normal to the touchscreen surface, or both, and may also be capable of sensing a level of pressure applied to the touchscreen surface. The touchscreen 154 may be formed of one or more translucent or transparent insulating layers and one or more translucent or transparent conducting layers. The touchscreen 154 may take other forms as well.

The microphone 156 may be configured to receive audio (e.g., a voice command or other audio input) from a user of the automobile 100. Similarly, the speakers 158 may be configured to output audio to the user of the automobile 100.

The peripherals 108 may additionally or alternatively include components other than those shown.

The power supply 110 may be configured to provide power to some or all of the components of the automobile 100. To this end, the power supply 110 may include, for example, a rechargeable lithium-ion or lead-acid battery. In some examples, one or more banks of batteries could be configured to provide electrical power. Other power supply materials and configurations are possible as well. In some examples, the power supply 110 and energy source 120 may be implemented together, as in some all-electric cars.

The processor 113 included in the computing device 111 may comprise one or more general-purpose processors and/or one or more special-purpose processors (e.g., image processor, digital signal processor, etc.). To the extent that the processor 113 includes more than one processor, such processors could work separately or in combination. The computing device 111 may be configured to control functions of the automobile 100 based on input received through the user interface 112, for example.

The memory 114, in turn, may comprise one or more volatile and/or one or more non-volatile storage components, such as optical, magnetic, and/or organic storage, and the memory 114 may be integrated in whole or in part with the processor 113. The memory 114 may contain the instructions 115 (e.g., program logic) executable by the processor 113 to execute various automobile functions.

The components of the automobile 100 could be configured to work in an interconnected fashion with other components within and/or outside their respective systems. To this end, the components and systems of the automobile 100 may be communicatively linked together by a system bus, network, and/or other connection mechanism (not shown).

Further, while each of the components and systems are shown to be integrated in the automobile 100, in some examples, one or more components or systems may be removably mounted on or otherwise connected (mechanically or electrically) to the automobile 100 using wired or wireless connections.

The automobile 100 may include one or more elements in addition to or instead of those shown. For example, the automobile 100 may include one or more additional interfaces and/or power supplies. Other additional components are possible as well. In these examples, the memory 114 may further include instructions executable by the processor 113 to control and/or communicate with the additional components.

Figure 2:
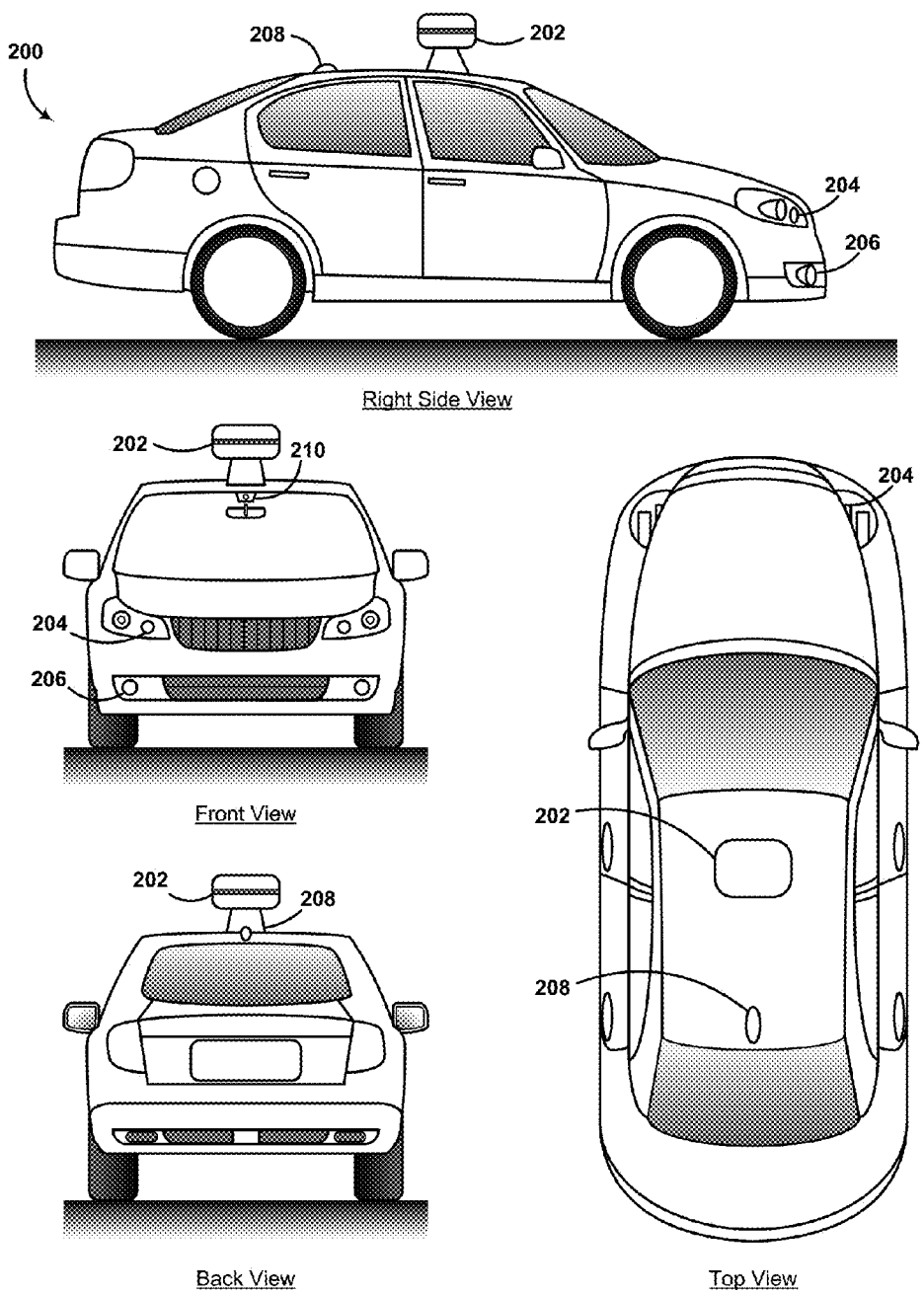
FIG. 2 illustrates an example automobile, in accordance with an example embodiment.

FIG. 2 illustrates an example automobile 200, in accordance with an embodiment. In particular, FIG. 2 shows a Right Side View, Front View, Back View, and Top View of the automobile 200. Although automobile 200 is illustrated in FIG. 2 as a car, other examples are possible. For instance, the automobile 200 could represent a truck, a van, a semi-trailer truck, a motorcycle, a golf cart, an off-road vehicle, or a farm vehicle, among other examples. As shown, the automobile 200 includes a first sensor unit 202, a second sensor unit 204, a third sensor unit 206, a wireless communication system 208, and a camera 210.

Each of the first, second, and third sensor units 202-206 may include any combination of global positioning system sensors, inertial measurement units, RADAR units, LIDAR units, cameras, lane detection sensors, and acoustic sensors. Other types of sensors are possible as well.

While the first, second, and third sensor units 202 are shown to be mounted in particular locations on the automobile 200, in some examples the sensor unit 202 may be mounted elsewhere on the automobile 200, either inside or outside the automobile 200. Further, while only three sensor units are shown, in some examples more or fewer sensor units may be included in the automobile 200.

In some examples, one or more of the first, second, and third sensor units 202-206 may include one or more movable mounts on which the sensors may be movably mounted. The movable mount may include, for example, a rotating platform. Sensors mounted on the rotating platform could be rotated so that the sensors may obtain information from each direction around the automobile 200. Alternatively or additionally, the movable mount may include a tilting platform. Sensors mounted on the tilting platform could be tilted within a particular range of angles and/or azimuths so that the sensors may obtain information from a variety of angles. The movable mount may take other forms as well.

Further, in some examples, one or more of the first, second, and third sensor units 202-206 may include one or more actuators configured to adjust the position and/or orientation of sensors in the sensor unit by moving the sensors and/or movable mounts. Example actuators include motors, pneumatic actuators, hydraulic pistons, relays, solenoids, and piezoelectric actuators. Other actuators are possible as well.

The wireless communication system 208 may be any system configured to wirelessly couple to one or more other automobiles, sensors, or other entities, either directly or via a communication network as described above with respect to the wireless communication system 152 in FIG. 1. While the wireless communication system 208 is shown to be positioned on a roof of the automobile 200, in other examples the wireless communication system 208 could be located, fully or in part, elsewhere.

The camera 210 may be any camera (e.g., a still camera, a video camera, etc.) configured to capture images of the environment in which the automobile 200 is located. To this end, the camera 210 may take any of the forms described above with respect to the camera 134 in FIG. 1. While the camera 210 is shown to be mounted inside a front windshield of the automobile 200, in other examples the camera 210 may be mounted elsewhere on the automobile 200, either inside or outside the automobile 200.

The automobile 200 may include one or more other components in addition to or instead of those shown.

A control system of the automobile 200 may be configured to control the automobile 200 in accordance with a control strategy from among multiple possible control strategies. The control system may be configured to receive information from sensors coupled to the automobile 200 (on or off the automobile 200), modify the control strategy (and an associated driving behavior) based on the information, and control the automobile 200 in accordance with the modified control strategy. The control system further may be configured to monitor the information received from the sensors, and continuously evaluate driving conditions; and also may be configured to modify the control strategy and driving behavior based on changes in the driving conditions.

As an example, the control system may be configured to detect a hazard condition (e.g., an accident site, spillage of chemicals on a road, etc.) on a road by detecting road flares indicative of the hazard condition; and may be configured to modify the control strategy based on road changes caused by the hazard condition. Use of road flares may be regulated by standard specifications and rules. For example, an example rule may state that work vehicles should carry a supply of road flares and that the use of flares should be to alert drivers to emergencies and not as routine traffic control device. The standard specifications may direct drivers to be cautious at incident sites where flammable materials, such as fuel spills, are suspected, and to use electronic flares or orange/red-glow sticks. Road flares should be placed on roads and should be removed when a related incident has terminated.

Figure 3:
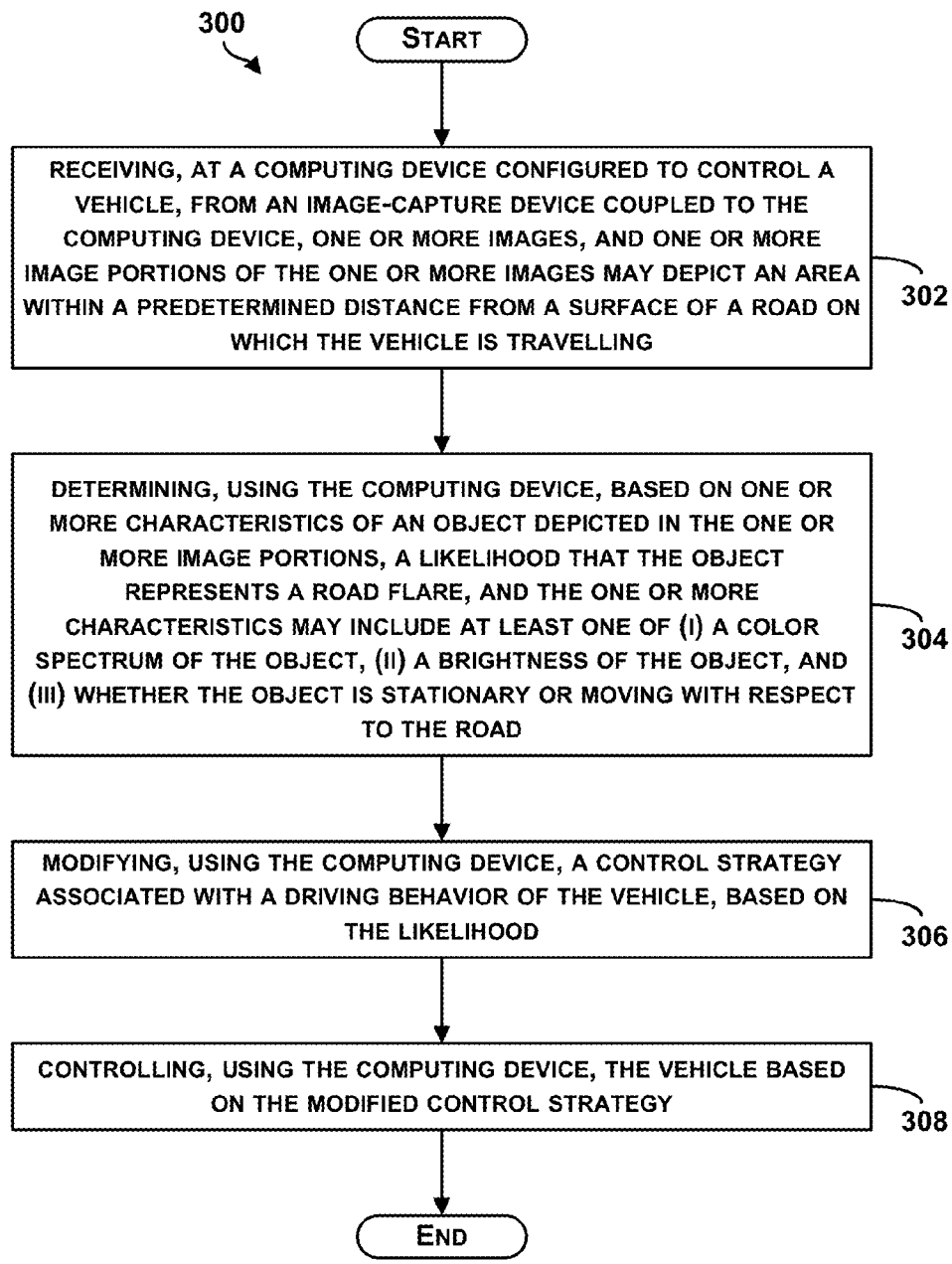
FIG. 3 is a flow chart of a method for detection of a road flare, in accordance with an example embodiment.
Figure 4:
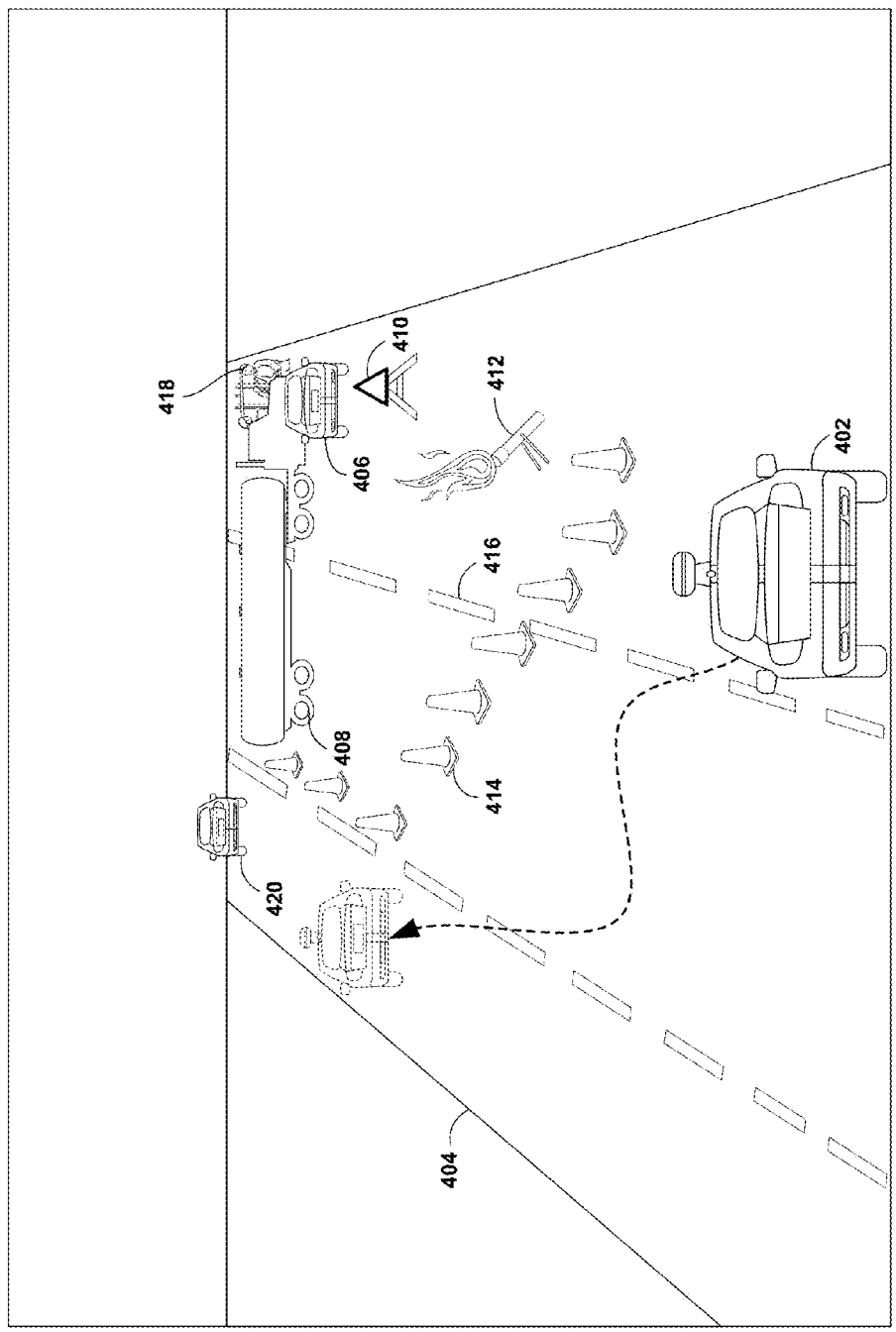
FIG. 4 illustrates a vehicle approaching a hazard condition on a road indicated by a road flare, in accordance with an example embodiment.
Figure 5A:
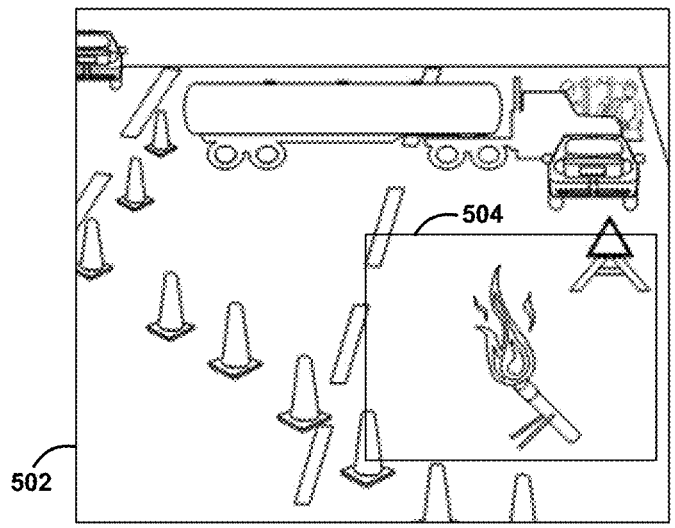
FIG. 5A illustrates an image of a road, in accordance with an example embodiment.
Figure 5B:
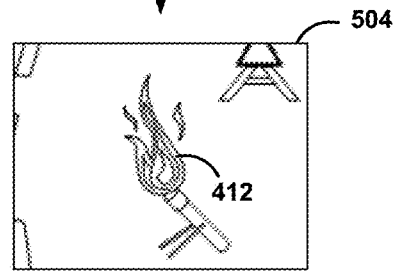
FIG. 5B illustrates a portion of the image of the road depicting an area within a predetermined distance from a surface of the road, in accordance with an example embodiment.

FIG. 3 is a flow chart of a method 300 for road flare detection, in accordance with an example embodiment. FIG. 4 illustrates a vehicle approaching a hazard condition indicated by a road flare, in accordance with an embodiment, to illustrate the method 300. FIG. 5A illustrates an image of a road, in accordance with an example embodiment, and FIG. 5B illustrates a portion of the image of the road depicting an area within a predetermined distance from a surface of the road, in accordance with an example embodiment. FIGS. 3, 4, and 5A-5B will be described together.

The method 300 may include one or more operations, functions, or actions as illustrated by one or more of blocks 302-308. Although the blocks are illustrated in a sequential order, these blocks may in some instances be performed in parallel, and/or in a different order than those described herein. Also, the various blocks may be combined into fewer blocks, divided into additional blocks, and/or removed based upon the desired implementation.

In addition, for the method 300 and other processes and methods disclosed herein, the flowchart shows functionality and operation of one possible implementation of present embodiments. In this regard, each block may represent a module, a segment, or a portion of program code, which includes one or more instructions executable by a processor for implementing specific logical functions or steps in the process. The program code may be stored on any type of computer readable medium or memory, for example, such as a storage device including a disk or hard drive. The computer readable medium may include a non-transitory computer readable medium, for example, such as computer-readable media that stores data for short periods of time like register memory, processor cache and Random Access Memory (RAM).

The computer readable medium may also include non-transitory media or memory, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, a tangible storage device, or other article of manufacture, for example.

In addition, for the method 300 and other processes and methods disclosed herein, each block in FIG. 3 may represent circuitry that is wired to perform the specific logical functions in the process.

At block 302, the method 300 includes receiving, at a computing device configured to control a vehicle, from an image-capture device coupled to the computing device, one or more images, and one or more image portions of the one or more images may depict an area within a predetermined distance from a surface of a road on which the vehicle is travelling. The computing device may be onboard the vehicle or may be off-board but in wireless communication with the vehicle, for example. Also, the computing device may be configured to control the vehicle in an autonomous or semi-autonomous operation mode. Also, the computing device may be configured to receive, from sensors coupled to the vehicle, information associated with, for example, condition of systems and subsystems of the vehicle, driving conditions, road conditions, etc. Further, an image-capture device (e.g., the camera 134 in FIG. 1 or the camera 210 in FIG. 2) may be coupled to the vehicle and in communication with the computing device. The image-capture device may be configured to capture images or video of the road and vicinity of the road on which the vehicle is travelling on.

FIG. 4 illustrates a vehicle 402 approaching a hazard condition on a road 404; the hazard condition is an accident site where another vehicle 406 collided with a truck 408 as an example. The accident site is used as an example hazard condition for illustration only. Other hazard conditions are possible. The computing device may be configured to detect the hazard condition by detecting a warning sign 410 or by determining whether a bright object 412 represents a road flare indicative of the hazard condition on the road 404.

FIG. 5A illustrates an example image 502 captured by an image-capture device coupled to the vehicle 402 in FIG. 4. In an example, the image-capture device may be configured to continuously capture still images or a video from which the still images can be extracted. In one example, one or more image-capture devices may be coupled to the vehicle 402; the one or more image-capture devices may be configured to capture the images from multiple views to take into account surroundings of the vehicle 402 and road condition from all directions.

As described above with respect to the standard specifications regulating the use of road flares, road flares may be placed on roads (i.e., close to ground level). Therefore, to determine whether the bright object 412 represents a road flare, the computing device may be configured to determine image portions, in the images (e.g., the image 502) captured by the image-capture device, which may depict an area within a predetermined distance from a surface of the road 404 such that the area encompasses any road flares placed on the road 404. The predetermined distance, for example, may be related to a height that may encompass typical lit road flares. In one example, the bright object 412 may be wholly included in the image portions, and in another example, a portion of the bright object 412 may be included in the image portions. As an example, in FIG. 5A, the computing device may be configured to determine an image portion 504 in the image 502 depicting an area within a predetermined distance from a surface of the road 404. FIG. 5B illustrates the image portion 504 depicting the bright object 412.

In an example, to determine the image portion 504 depicting the area within the predetermined distance from the surface of the road 404, the computing device may be configured to determine a location of the surface in the image 502. In one example, the computing device may be configured to use image recognition techniques to detect and identify the location of the surface in the image 502. However, in another example, brightness of the bright object 412 may saturate the image 502, and such image saturation may hinder detecting and identifying the location of the surface in the image 502. Image saturation may refer to intensity of colors in the image; a saturated image may have overly bright colors. In an example, even images captured by a camera with fast exposure time, small aperture, and low gain may still be saturated due to brightness of the bright object 412. In this example, the computing device may be configured to use other means to determine the location of the surface of the road 404.

For example, the computing device may be configured to receive LIDAR-based information to determine the location based on light emitted from a LIDAR unit coupled to the vehicle 402, and reflected off the surface of the road 404. In another example, the computing device may be configured to receive RADAR-based information to determine the location of the surface based on radio waves emitted from a RADAR unit and reflected off the surface of the road 404. In still another example, the computing device may be configured to use a pre-existing map of surface elevation of the road 404 to determine the location of the surface at a particular portion of the road 404. The computing device may be configured to use a Global Positioning System sensor coupled to the vehicle 402 to determine geographic location of the particular portion of the road 404 (i.e., with respect to the Earth, using satellite-based positioning data) to determine an associated road surface elevation, and thus a location of the surface of the road 404, from the pre-existing map. In yet another example, the computing device may be configured to receive sensor information indicative of pitch and roll angles of the vehicle 402, and determine a driving attitude of the vehicle 402, based on the sensor information. The computing device may be configured to infer the location of the surface of the road 404 from the driving attitude of the vehicle 402 using vehicle parameters (e.g., vehicle dimensions, vehicle center of gravity location, etc.).

Referring back to FIG. 3, at block 304, the method 300 includes determining, using the computing device, based on one or more characteristics of an object depicted in the one or more image portions, a likelihood that the object represents a road flare, and the one or more characteristics may include at least one of (i) a color spectrum of the object, (ii) a brightness of the object, and (iii) whether the object is stationary or moving with respect to the road. As an example, road flare may be characterized by brightness level, color spectrum, hue, luminosity, and motion characteristics. For example, road flare may be brighter than other objects on the road, and may have a red/orange glow. Also, road flare may be stationary, since road flare is placed on road surfaces and not attached to moving objects. Based on a comparison of characteristics of an object depicted in an image portion to characteristics of a typical road flare, the computing device may be configured to determine the likelihood that the object represents a road flare.

As mentioned above, as an example, road flare may be characterized by a red/orange glow. Thus, the computing device may be configured to determine whether a detected object is a road flare based on a comparison of color spectrum of the object to color spectrum of a typical road flare. For instance, the computing device may be configured to determine intensity of different colors (e.g., Red, Green, and Blue or RGB color model) depicted in an image of the object to determine the color spectrum of the detected object, and compare the determined color spectrum to a typical road flare color spectrum. In one example, the computing device may be configured to detect visible color spectrum of the object (e.g., portion of electromagnetic spectrum that is visible to human eye); but, in another example, the computing device may be configured to detect invisible color spectrum (e.g., ultraviolet or infrared) of the object. The image-capture device coupled to the computing device may be configured to capture images depicting the visible and/or invisible color spectrum of the detected object.

In examples, the computing device may be configured to determine, using image recognition techniques, the characteristics (e.g., color spectrum, brightness, etc.) of the object depicted in the image portion, and determine the likelihood based on the determined characteristics (e.g., compare the determined characteristics of the object to typical characteristics of typical road flares). In an example, the computing device may be configured to cause the image-capture device to capture a sequence of images while changing image capturing parameters of the image-capture device (e.g., speed of exposure, aperture, resolution, focal depth, etc.) from one image to a following image. If image portions depicting the object remain saturated throughout the sequence of images because of brightness of the object, then the computing device may assign or determine a high likelihood that the object represents a road flare, for example. Also, the sequence of images captured while the vehicle controlled by the computing device is moving may indicate whether the object is stationary relative to the road and thus exhibits characteristics of a road flare.

In an example, the computing device may be configured to assign a respective likelihood to each characteristic of the characteristics based on a comparison of that characteristic to a corresponding characteristic of a typical road flare. As an example, the computing device may be configured to a match metric indicative of how similar that characteristic is to the corresponding characteristic of the typical road flare (e.g., a percentage of match between that characteristic and the corresponding characteristic of the typical road flare). The computing device may be configured to determine the respective likelihood based on the match metric. Further the computing device may be configured to determine a single likelihood, based on a combination of the respective likelihoods, indicative of a level of confidence that the object represents a road flare.

For instance, the computing device may be configured to detect a bright object; however, the bright object may be moving, which may indicate that the object may be a chrome part on another vehicle reflecting sun light, for example, and does not represent a road flare. In this example, a first respective likelihood relating to characteristic of brightness may be high, but a second respective likelihood relating to characteristic of motion may be low. The overall likelihood that this moving object represents a road flare may be low, for example. In an example, the overall likelihood may be a weighted combination of the respective likelihoods.

In one example, the computing device may be configured to receive LIDAR-based information or RADAR-based information indicating that the object is stationary and is in an open space as opposed to being a sun reflection from an object attached to a larger moving object, for example, to verify whether the object represents a road flare.

In another example, the computing device may be configured to generate a probabilistic model (e.g., a Gaussian distribution), based on characteristics of an object depicted in an image portion, to determine the likelihood that the object represents a road flare. For example, the likelihood that the object represents a road flare may be determined as a function of a set of parameter values that are determined based on the characteristics of the object (color spectrum, brightness, motion or lack of motion, etc.). In this example, the likelihood may be defined as equal to probability of an observed outcome (the object represents a road flare) given those parameter values. Those skilled in the art will appreciate that determining the likelihood function may involve distinguishing between discrete probability distribution, continuous probability distribution, and mixed continuous-discrete distributions, and that several types of likelihood exist such as log likelihood, relative likelihood, conditional likelihood, marginal likelihood, profile likelihood, and partial likelihood.

In still another example, the computing device may be configured to process the characteristics of the object through a classifier to determine the likelihood. The classifier can be defined as an algorithm or mathematical function implemented by a classification algorithm that maps input information (e.g., the characteristics of the object) to a class (e.g., the object represents a road flare).

Classification may involve identifying to which of a set of classes (e.g., the object represents or does not represent a road flare) a new observation may belong, on the basis of a training set of data containing observations (or instances) with a known class. The individual observations may be analyzed into a set of quantifiable properties, known as various explanatory variables or features. As an example, classification may include assigning a respective likelihood to "object represents a road flare" or "object does not represent a road flare" classes as indicated by respective determined characteristics of a respective object (e.g., color spectrum, brightness, motion or lack of motion, etc.).

In one example, the classification may include a probabilistic classification. Probabilistic classification algorithms may output a probability of an instance (e.g., a driving situation or a group of observations indicated by determined characteristics of respective object) being a member of each of the possible classes: "object represents a road flare" or "object does not represent a road flare". Determining likelihood that the respective object represents a road flare may be based on probability assigned to each class. Also, the probabilistic classification can output a confidence value associated with determining that the respective object represents a road flare.

Example classification algorithms may include Linear classifiers (e.g., Fisher's linear discriminant, logistic regression, naive Bayes, and perceptron), Support vector machines (e.g., least squares support vector machines), quadratic classifiers, kernel estimation (e.g., k-nearest neighbor), boosting, decision trees (e.g., random forests), neural networks, Gene Expression Programming, Bayesian networks, hidden Markov models, and learning vector quantization. Other example classifiers are also possible.

As an example for illustration, a linear classifier may be expressed as a linear function that assigns a score or likelihood to each possible class k (e.g., "object represents a road flare" or "object does not represent a road flare") by combining a feature vector (vector of parameters associated with the characteristics of the object) of an instance (e.g., a driving situation) with a vector of weights, using a dot product. Class with the higher score or likelihood may be selected as a predicted class. This type of score function is known as a linear predictor function and may have this general form:

$$\text{Score}(X_i, k) = \beta_k \cdot X_i \qquad \text{Equation (1)}$$

where $X_i$ is the feature vector for instance i, $\beta_k$ is a vector of weights corresponding to category k, and score($X_i$, k) is the score associated with assigning instance i to category k.

As an example, a training computing device may be configured to receive training data for a plurality of driving situations of a given vehicle. For example, for each of the plurality of driving situations, respective training data may include respective determined characteristics of a respective object. Also, the training computing device may be configured to receive positive or negative indication that the respective object represents a road flare corresponding to the respective training data for each of the driving situations. Further the training computing device may be configured to correlate, for each driving situation, the positive or negative indication with the respective training data; and determine parameters (e.g., vector of weights for equation 1) of the classifier based on the correlations for the plurality of driving situations. These parameters may be provided to the computing device configured to control the vehicle such that as the computing device determines characteristics of an object, the computing device may be configured to process the characteristics through the classifier using the determined parameters of the classifier to determine the likelihood that the object represents a road flare.

In one example, the likelihood may be qualitative such as "low," "medium," or "high" or may be numerical such as a number on a scale, for example. Other examples are possible. Referring to FIG. 4, the computing device may be configured to determine the likelihood that the bright object 412 represents a road flare using any of the techniques described above.

At block 306, the method 300 includes modifying, using the computing device, a control strategy associated with a driving behavior of the vehicle, based on the likelihood.

The control system of the vehicle may support multiple control strategies and associated driving behaviors that may be predetermined or adaptive to changes in a driving environment of the vehicle. Generally, a control strategy may comprise sets of rules associated with traffic interaction in various driving contexts such as approaching a hazard condition. The control strategy may comprise rules that determine a speed of the vehicle and a lane that the vehicle may travel on while taking into account safety and traffic rules and concerns (e.g., road traffic changes due to existence of a hazard condition, vehicles stopped at an intersection and windows-of-opportunity in yield situation, lane tracking, speed control, distance from other vehicles on the road, passing other vehicles, and queuing in stop-and-go traffic, and avoiding areas that may result in unsafe behavior such as oncoming-traffic lanes, etc.). For instance, in approaching a hazard condition indicated by a road flare, the computing device may be configured to modify or select, based on the determined likelihood that a detected object represents the road flare, a control strategy comprising rules for actions that control the vehicle speed to safely maintain a distance with other objects and select a lane that is considered safest given road traffic changes due to the hazard condition.

As an example, referring to FIG. 4, if the likelihood that the bright object 412 represents a road flare is high (e.g., exceeds a predetermined threshold), the computing device may be configured to utilize sensor information, received from on-board sensors on the vehicle 402 or off-board sensors in communication with the computing device, in making a navigation decision rather than preexisting map information that may not include information and changes relating to the hazard condition. Also, the computing device may be configured to utilize the sensor information rather than the preexisting map information to estimate lane boundaries. For example, in FIG. 4, the computing device may be configured to determine locations of hazard condition markers (e.g., cone(s) 414) rather than lane markers 416 on the road 404 to estimate and follow the lane boundaries. As another example, the computing device may be configured to activate one or more sensors for detection of humans 418 and making the navigation decision based on the detection.

In an example, a first control strategy may comprise a default driving behavior and a second control strategy may comprise a defensive driving behavior. Characteristics of a the defensive driving behavior may comprise, for example, following another vehicle such as vehicle 420, maintaining a predetermined safe distance with the vehicle 420 that may be larger than a distance maintained in the default driving behavior, turning-on lights, reducing a speed of the vehicle 402, and stopping the vehicle 402. In this example, the computing device of the vehicle 402 may be configured to compare the determined likelihood to a threshold likelihood, and the computing device may be configured to select the first or the second control strategy, based on the comparison. For example, if the determined likelihood is greater than the threshold likelihood, the computing device may be configured to select the second driving behavior (e.g., the defensive driving behavior). If the determined likelihood is less than the threshold likelihood, the computing device may be configured to modify the control strategy to the first control strategy (e.g., select the default driving behavior).

In yet another example, alternatively or in addition to transition between discrete control strategies (e.g., the first control strategy and the second control strategy) the computing device may be configured to select from a continuum of driving modes or states based on the determined likelihood. In still another example, the computing device may be configured to select a discrete control strategy and also may be configured to select a driving mode from a continuum of driving modes within the selected discrete control strategy. In this example, a given control strategy may comprise multiple sets of driving rules, where a set of driving rules describe actions for control of speed and direction of the vehicle 402. The computing device further may be configured to cause a smooth transition from a given set of driving rules to another set of driving rules of the multiple sets of driving rules, based on the determined likelihood. A smooth transition may indicate that the transition from the given set of rules to another may not be perceived by a passenger in the vehicle 402 as a sudden or jerky change in a speed or direction of the vehicle 402, for example.

In an example, a given control strategy may comprise a program or computer instructions that characterize actuators controlling the vehicle 402 (e.g., throttle, steering gear, brake, accelerator, or transmission shifter) based on the determined likelihood. The given control strategy may include action sets ranked by priority, and the action sets may include alternative actions that the vehicle 402 may take to accomplish a task (e.g., driving from one location to another). The alternative actions may be ranked based on the determined likelihood, for example. Also, the computing device may be configured to select an action to be performed and, optionally, modified based on the determined likelihood.

In another example, multiple control strategies (e.g., programs) may continuously propose actions to the computing device. The computing device may be configured to decide which strategy may be selected or may be configured to modify the control strategy based on a weighted set of goals (safety, speed, etc.), for example. Weights of the weighted set of goals may be a function of the determined likelihood. Based on an evaluation of the weighted set of goals, the computing device, for example, may be configured to rank the multiple control strategies and respective action sets and select or modify a given strategy and a respective action set based on the ranking.

These examples and driving situations are for illustration only. Other examples and control strategies and driving behaviors are possible as well.

Referring back to FIG. 3, at block 308, the method 300 includes controlling, using the computing device, the vehicle based on the modified control strategy. In an example, the computing device may be configured to control actuators of the vehicle using an action set or rule set associated with the modified control strategy. For instance, the computing device may be configured to adjust translational velocity, or rotational velocity, or both, of the vehicle based on the modified driving behavior.

As an example, in FIG. 4, controlling the vehicle 402 may comprise determining a desired path of the vehicle, based on the likelihood. The computing device may have determined a high likelihood that the bright object 412 represents a road flare on the road 404 on which the vehicle 402 is travelling. In this example, the computing device may be configured to take into account lane boundary indicated by the lane markers 416 on the road 404 as a soft constraint (i.e., the lane boundary can be violated if a safer path is determined) when determining the desired path. The computing device thus may be configured to determine a number and locations of the cone(s) 414 that may form a modified lane boundary; and may be configured to adhere to the modified lane boundary instead of the lane boundary indicated by the lane markers 416.

As shown in FIG. 4, the vehicle 402 may be approaching an accident site indicated by a road flare (i.e., the bright object 412) on the road 404, and the computing device may be configured to control the vehicle 402 according to a defensive driving behavior to safely navigate the accident site. For example, the computing device may be configured to reduce speed of the vehicle 402, cause the vehicle 402 to change lanes and adhere to the modified lane boundary formed by the cone(s) 414, shift to a position behind the vehicle 420, and follow the vehicle 420 while keeping a predetermined safe distance.

These control actions and driving situations are for illustration only. Other actions and situations are possible as well. In one example, the computing device may be configured to control the vehicle based on the modified control strategy as an interim control until a human driver can take control of the vehicle.

Figure 6:
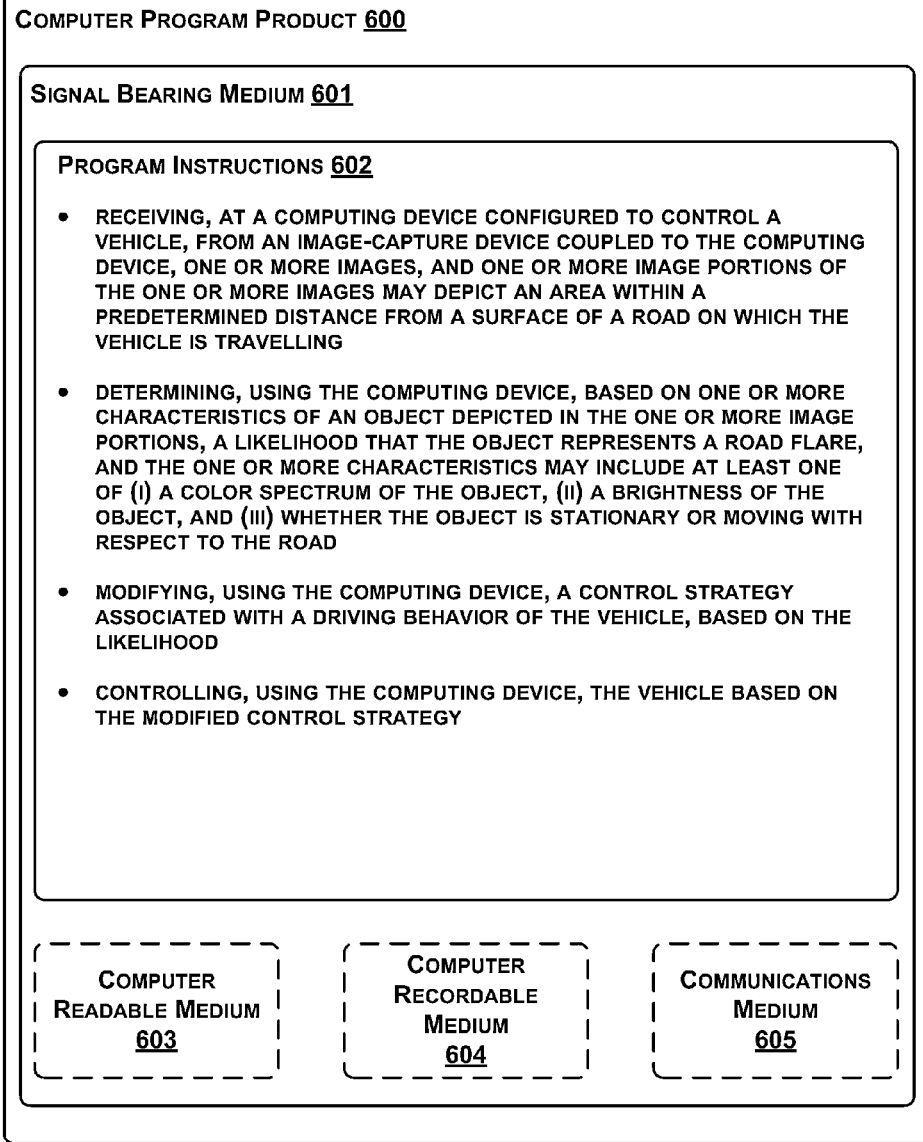
FIG. 6 is a schematic illustrating a conceptual partial view of a computer program, in accordance with an example embodiment.

In some embodiments, the disclosed methods may be implemented as computer program instructions encoded on a computer-readable storage media in a machine-readable format, or on other non-transitory media or articles of manufacture. FIG. 6 is a schematic illustrating a conceptual partial view of an example computer program product 600 that includes a computer program for executing a computer process on a computing device, arranged according to at least some embodiments presented herein. In one embodiment, the example computer program product 600 is provided using a signal bearing medium 601. The signal bearing medium 601 may include one or more program instructions 602 that, when executed by one or more processors may provide functionality or portions of the functionality described above with respect to FIGS. 1-5. Thus, for example, referring to the embodiments shown in FIG. 3, one or more features of blocks 302-308 may be undertaken by one or more instructions associated with the signal bearing medium 601. In addition, the program instructions 602 in FIG. 6 describe example instructions as well.

In some examples, the signal bearing medium 601 may encompass a computer-readable medium 603, such as, but not limited to, a hard disk drive, a Compact Disc (CD), a Digital Video Disk (DVD), a digital tape, memory, etc. In some implementations, the signal bearing medium 601 may encompass a computer recordable medium 604, such as, but not limited to, memory, read/write (R/W) CDs, R/W DVDs, etc. In some implementations, the signal bearing medium 601 may encompass a communications medium 605, such as, but not limited to, a digital and/or an analog communication medium (e.g., a fiber optic cable, a waveguide, a wired communications link, a wireless communication link, etc.). Thus, for example, the signal bearing medium 601 may be conveyed by a wireless form of the communications medium 605 (e.g., a wireless communications medium conforming to the IEEE 802.11 standard or other transmission protocol).

The one or more programming instructions 602 may be, for example, computer executable and/or logic implemented instructions. In some examples, a computing device such as the computing device described with respect to FIGS. 1-5 may be configured to provide various operations, functions, or actions in response to the programming instructions 602 conveyed to the computing device by one or more of the computer readable medium 603, the computer recordable medium 604, and/or the communications medium 605. It should be understood that arrangements described herein are for purposes of example only. As such, those skilled in the art will appreciate that other arrangements and other elements (e.g. machines, interfaces, functions, orders, and groupings of functions, etc.) can be used instead, and some elements may be omitted altogether according to the desired results. Further, many of the elements that are described are functional entities that may be implemented as discrete or distributed components or in conjunction with other components, in any suitable combination and location.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims, along with the full scope of equivalents to which such claims are entitled. It is also to be understood that the terminology used herein is for the purpose of describing particular embodiments only, and is not intended to be limiting.

What is claimed is:

1. A method, comprising:
  detecting, by computing device configured to control a vehicle, a bright object on a road of travel of the vehicle;
  receiving, at the computing device, from an image-capture device coupled to the vehicle, an image of the road;
  selecting, using the computing device, a portion of the image depicting an area within a predetermined threshold distance from a surface of the road proximate to the bright object, wherein the predetermined threshold distance is based on a height that encompasses a typical road flare;
  determining, using the computing device, based on (a) whether the portion of the image includes the bright object, and (b) one or more characteristics of the bright object, a likelihood that the bright object represents a road flare, wherein the one or more characteristics include at least one of (i) a color spectrum of the bright object, (ii) a brightness level of the bright object, and (iii) whether the bright object is stationary or moving with respect to the road;
  in response to the likelihood exceeding a predetermined threshold likelihood, identifying a hazardous condition indicated by the road flare and road changes resulting from the hazardous condition indicated by the road flare;
  modifying, using the computing device, a control strategy associated with a driving behavior of the vehicle, based on the likelihood, the hazardous condition, and the road changes resulting from the hazardous condition; and
  controlling, using the computing device, the vehicle based on the modified control strategy.

2. The method of claim 1, wherein the vehicle is in an autonomous operation mode.

3. The method of claim 1, further comprising;
receiving information indicative of a location of the surface of the road proximate to the bright object from one or more other sensors;
determining the location of the surface of the road based on the information indicative of the location of the surface of the road received from the one or more other sensors; and
determining the predetermined threshold distance from the surface of the road based on the determined location of the surface.

4. The method of claim 3, wherein the information includes at least one of:
(i) preexisting map of surface elevation of the road;
(ii) pitch and roll angles indicative of a driving attitude of the vehicle; and
(iii) LIDAR-based information corresponding to light emitted from a light detection and ranging (LIDAR) sensor and reflected from the surface of the road.

5. The method of claim 1, wherein receiving, from the image-capture device coupled to the computing device, the image comprises receiving a sequence of images, wherein image capturing parameters of the image-capture device are varied while capturing the sequence of images, and wherein the image capturing parameters include one or more of speed of exposure, aperture, resolution, and focal depth.

6. A non-transitory computer readable medium having stored thereon instructions executable by a computing device of a vehicle to cause the computing device to perform functions comprising:
detecting a bright object on a road of travel of the vehicle;
receiving, from an image-capture device coupled to the vehicle, an image of the road;
selecting, using the computing device, a portion of the image depicting an area within a predetermined threshold distance from a surface of the road proximate to the bright object, wherein the predetermined threshold distance is based on a height that encompasses a typical road flare;
determining, based on (a) whether the portion of the image includes the bright object, and (b) one or more characteristics of the bright object, a likelihood that the bright object represents a road flare, wherein the one or more characteristics include at least one of (i) a color spectrum of the bright object, (ii) a brightness level of the bright object, and (iii) whether the bright object is stationary or moving with respect to the road;
in response to the likelihood exceeding a predetermined threshold likelihood, identifying a hazardous condition indicated by the road flare and road changes resulting from the hazardous condition indicated by the road flare;
modifying a control strategy associated with a driving behavior of the vehicle, based on the likelihood, the hazardous condition, and the road changes resulting from the hazardous condition; and
controlling the vehicle based on the modified control strategy.

7. The non-transitory computer readable medium of claim 6, wherein the vehicle is in an autonomous operation mode.

8. The non-transitory computer readable medium of claim 6, wherein the instructions are further executable by the computing device to cause the computing device to perform functions comprising:
receiving information indicative of a location of the surface of the road proximate to the bright object from one or more other sensors;
determining the location of the surface of the road based on the information indicative of the location of the surface of the road received from the one or more other sensors; and
determining the predetermined threshold distance from the surface of the road based on the determined location of the surface.

9. The non-transitory computer readable medium of claim 8, wherein the information includes at least one of:
(i) preexisting map of surface elevation of the road;
(ii) pitch and roll angles indicative of a driving attitude of the vehicle; and
(iii) LIDAR-based information corresponding to light emitted from a light detection and ranging (LIDAR) sensor and reflected from the surface of the road.

10. The non-transitory computer readable medium of claim 6, the function of receiving the image comprises receiving a sequence of images, wherein image capturing parameters of the image-capture device are varied while capturing the sequence of images, and wherein the image capturing parameters include one or more of speed of exposure, aperture, resolution, and focal depth.

11. The non-transitory computer readable medium of claim 6, wherein the function of controlling the vehicle based on the modified control strategy comprises one or more of: (i) utilizing sensor information received from on-board or off-board sensors in making a navigation decision rather than preexisting map information, (ii) utilizing the sensor information to estimate lane boundaries rather than the preexisting map information, (iii) determining locations of hazard condition markers rather than lane markers on the road to estimate and follow the lane boundaries, (iv) activating one or more sensors for detection of humans and making the navigation decision based on the detection, (v) following another vehicle, (vi) maintaining a predetermined safe distance with other vehicles, (vii) turning-on lights, and (viii) reducing a speed of the vehicle.

12. The non-transitory computer readable medium of claim 6, wherein the instructions are further executable by the computing device to cause the computing device to perform functions comprising:
determining the one or more characteristics of the object; and
determining, for each characteristic of the one or more characteristics, a respective likelihood based on a comparison of that characteristic to a corresponding characteristic of a typical road flare, wherein determining the likelihood that the object represents the road flare is based on a combination of the respective likelihoods of the one or more characteristics.

13. A control system for a vehicle, comprising:
an image-capture device; and
a computing device in communication with the image capture-device and configured to:
detect a bright object on a road of travel of the vehicle;
receive, from the image-capture device, an image of the road;
selecting, using the computing device, a portion of the image depicting an area within a predetermined threshold distance from a surface of the road proximate to the bright object, wherein the predetermined threshold distance is based on a height that encompasses a typical road flare;
determine, based on (a) whether the portion of the image includes the bright object, and (b) one or more characteristics of the bright object depicted in the one or more image portions, a likelihood that the bright object represents a road flare, wherein the one or more characteristics include at least one of (i) a color spectrum of the bright object, (ii) a brightness level of the bright object, and (iii) whether the bright object is stationary or moving with respect to the road;

in response to the likelihood exceeding a predetermined threshold likelihood, identifying a hazardous condition indicated by the road flare and road changes resulting from the hazardous condition indicated by the road flare;

modify a control strategy associated with a driving behavior of the vehicle, based on the likelihood, the hazardous condition, and the road changes resulting from the hazardous condition; and control the vehicle based on the modified control strategy.

14. The system of claim 13, wherein the computing device is further configured to control the vehicle in an autonomous operation mode.

15. The system of claim 13, wherein the computing device is further configured to:

receive information indicative of a location of the surface of the road proximate to the bright object from one or more other sensors coupled to the vehicle;

determine the location of the surface of the road based on the information indicative of the location of the surface of the road received from the one or more other sensors; and determine the predetermined threshold distance from the surface of the road based on the determined location of the surface.

16. The system of claim 15, wherein the information includes at least one of:

(i) preexisting map of surface elevation of the road;
(ii) pitch and roll angles indicative of a driving attitude of the vehicle; and
(iii) LIDAR-based information corresponding to light emitted from a light detection and ranging (LIDAR) sensor and reflected from the surface of the road.

17. The system of claim 13, wherein the computing device is further configured to receive a sequence of images, wherein image capturing parameters of the image-capture device are varied while capturing the sequence of images, and wherein the image capturing parameters include one or more of speed of exposure, aperture, resolution, and focal depth.

* * * * *